(No Model.)

W. P. CARMICHAEL.
WHEELBARROW.

No. 556,616. Patented Mar. 17, 1896.

Witnesses.
Robert Everett.
Geo. N. Rea.

Inventor.
William P. Carmichael.
By James L. Norris.
Atty.

UNITED STATES PATENT OFFICE.

WILLIAM PAUL CARMICHAEL, OF SAVANNAH, GEORGIA.

WHEELBARROW.

SPECIFICATION forming part of Letters Patent No. 556,616, dated March 17, 1896.

Application filed December 28, 1895. Serial No. 573,602. (No model.)

*To all whom it may concern:*

Be it known that I, WILLIAM PAUL CARMICHAEL, a citizen of the United States, residing at Savannah, in the county of Chatham and State of Georgia, have invented new and useful Improvements in Wheelbarrows, of which the following is a specification.

This invention relates to wheelbarrows, and has for its chief object to provide a novel, simple, efficient, and economical barrow which is particularly designed for traveling on run-planks in canal work, but is susceptible of general use by persons engaged on railroads and other earthwork, the construction being such that the vehicle can be easily balanced and caused to safely make abrupt or short turns, and is firmly sustained or supported by an automatic folding device which can be thrown into supporting position by the pressure of the foot for the purpose of sustaining and steadying the vehicle in an upright position while the vehicle is being loaded.

The invention also has for its object to provide a new and improved wheelbarrow which can be conveniently and quickly replaced on run-planks if by accident it should be run off of or displaced therefrom, and which, though having a front and a rear wheel, can be easily manipulated to balance the load on an approximately central wheel for abrupt turns and other purposes.

To accomplish all these objects the invention consists essentially in a wheelbarrow composed of a body, a leg-frame, a frame supporting the body, a front wheel and a rear wheel of uniform diameter journaled on the supporting-frame approximately in line with the longitudinal axis of the barrow, and a self-folding spring-impelled foot-piece connected with the lower end of the leg-frame and automatically folded upwardly by the action of the spring when the barrow is pushed forward or is raised at the rear.

The invention also consists in certain other features of construction and combination or arrangement of parts hereinafter described and claimed, reference being made to the accompanying drawings, in which—

Figure 1:
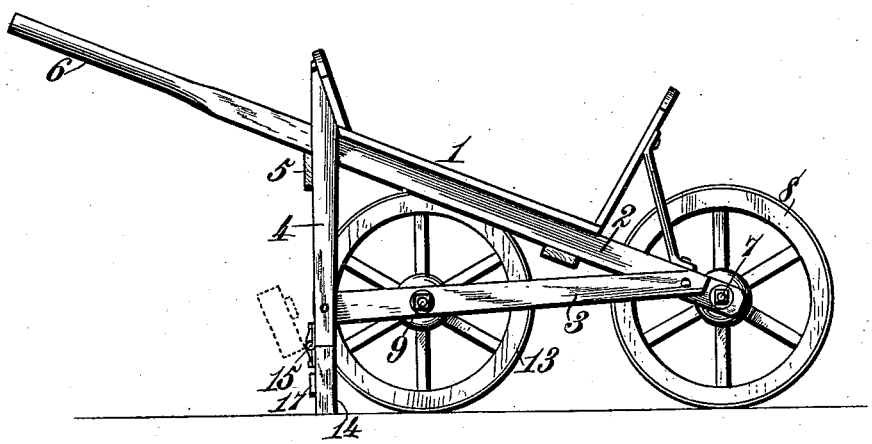
Figure 2:
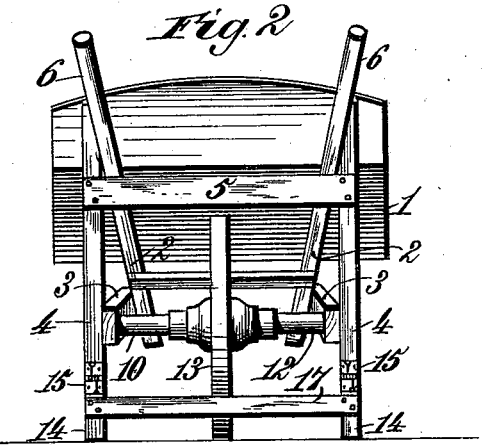
Figure 3:
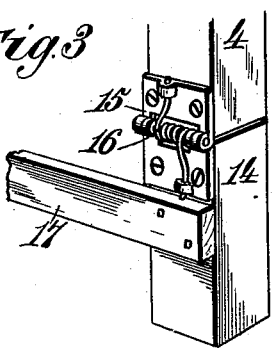

Figure 1 is a side elevation of a wheelbarrow constructed in accordance with my invention, the spring-impelled foot-piece being represented by full lines in the position it occupies when supporting the barrow and by dotted lines in its upwardly-folded position. Fig. 2 is a front elevation of the wheelbarrow; and Fig. 3 is a detail perspective view showing a portion of the leg-frame, a portion of the foot-piece, and one of the spring-hinges for connecting the foot-piece to the leg-frame.

In order to enable those skilled in the art to make and use my invention, I will now describe the same in detail, referring to the drawings, wherein—

The numeral 1 indicates the body of the wheelbarrow, which is supported on a frame composed of the inclined side sills 2 and the horizontal side bars or beams 3, connected at their rear ends to the leg-frame, which, as here shown, comprises two upright bars 4, rigidly connected by a cross-bar 5. The side sills 2 are extended rearwardly to form rigid handle-bars 6, adapted to be grasped by the workman for gripping or otherwise manipulating the barrow. The front ends of the side sills are connected by an axle 7, on the center of which is mounted the front wheel, 8, which may be of any ordinary or other construction suitable for the purpose. The longitudinal side bars or beams 3 are connected together in front of the leg-frame through the medium of an axle 9, composed simply of a bolt or rod on which are mounted the sleeves 10 and 12. The rear wheel, 13, is mounted on the axle 9 between the sleeves 10 and 12, so that the latter serve to retain the wheel in a central position and in line with the front wheel, 8, in such manner that both wheels are mounted at the longitudinal center of the barrow. The wheels 8 and 13 are coequal in diameter, or substantially so, and the wheel 13 is journaled approximately at the center of the body, so that the workman can readily balance the wheelbarrow and the load on this approximately central wheel by downward pressure on the handle-bars, thereby enabling the wheelbarrow to be quickly rotated on the wheel as an axis for turning abrupt or sharp curves, or for other purposes, such as replacing the wheelbarrow on a run-plank if the barrow is accidentally run off of or displaced therefrom. The wheelbarrow can be readily caused to travel on both wheels by simply pushing or pulling it in the usual manner, or the handle-bars can be raised a sufficient distance to elevate the wheel 13 from the surface traversed and thus utilize the front wheel, 8, only in the traveling movements of the barrow.

Inasmuch as the front and rear wheels are journaled in a line approximately coincident with the longitudinal axis of the body of the barrow, the latter will not stand upright unless the workman supports the same through the medium of the handle-bars, or a special prop be employed to hold the barrow upright. It is therefore desirable to provide simple and efficient means for supporting the wheelbarrow in an upright position while it is being loaded or while it is standing for any purpose without the workman being compelled to support the vehicle through the medium of the handle-bars.

To accomplish this object I provide a self-folding spring-impelled foot-piece which, as here shown, is composed of short supporting-bars 14, connected to the lower ends of the leg-frame bars 4 through the medium of hinges 15, having suitable springs 16 of such construction that the springs serve to automatically fold the foot-piece in an upward direction into approximately the position indicated by dotted lines in Fig. 1. The short bars 14 are connected together by a cross-bar 17, so that downward pressure on this cross-bar will cause both short bars 14 to uniformly descend into the position represented by full lines, Fig. 1, in which position the foot-piece supports the wheelbarrow in an upright position, so that while it is being loaded it is unnecessary for the workman to support the barrow and the material introduced thereinto during the loading operation.

When the wheelbarrow is loaded and is to be moved by the workman it is only necessary for the workman to push the barrow forward, which will obviously move the foot-piece rearward and thus permit the spring-hinges to automatically fold the same upward into the position indicated by dotted lines in Fig. 1. If for any reason the workman desires to leave the loaded wheelbarrow standing in an upright position, he can, by a simple downward movement of his foot on the cross-bar 17 of the foot-piece, cause the latter to descend in operative supporting position, as represented by full lines in Fig. 1, and thus cause the foot-piece to support the wheelbarrow and effectually prevent it from tilting or upsetting.

It will be observed that the foot-piece is a self-folding spring-impelled foot-piece, and that I have illustrated the springs as forming parts of the hinges 15; but I do not wish to be understood as confining myself to the springs forming parts of the hinges, as they may be otherwise arranged to act upon the foot-piece and cause it to automatically fold upwardly whenever the wheelbarrow is moved forward a sufficient distance to disengage the lower end of the foot-piece from contact with the ground or other surface on which it rests when supporting the wheelbarrow in an upright position.

It will be observed that in my construction the rear wheel is substantially the same diameter as the front wheel, and that this rear wheel is placed under the body and approximately at the center of the same in such manner that the workman by a slight pressure on the handles places the entire weight of the load on this single wheel, so that it is possible to easily and conveniently make an abrupt or short turn.

In the general use of wheelbarrows they often run off the run-planks, and whenever this occurs the wheelbarrow constructed according to my invention can be readily replaced on the run-plank by balancing the barrow on the central rear wheel and placing the front wheel on the plank. In this respect my invention is very advantageous and entirely avoids obstructions which sometimes occur by an ordinary wheelbarrow running off the run-plank and obstructing the work until it is replaced, which, with ordinary constructions, occupies considerable time.

In my improved construction the workman is entirely relieved from sustaining the weight of the load in the wheelbarrow, and obviously is able to carry a much larger load than is possible with the ordinary wheelbarrow, which requires to be supported by the handles while being moved forward on a single wheel.

Having thus described my invention, what I claim is—

1. A wheelbarrow, consisting of a body, a leg-frame, a frame supporting the body, a front wheel and a rear wheel of substantially uniform diameter journaled on the supporting-frame at the longitudinal center thereof, and a self-folding spring-impelled foot-piece connected with the lower end of the leg-frame and automatically folded upwardly by the spring action when the barrow is moved forward, substantially as described.

2. A wheelbarrow, consisting of a body, inclined side sills extended into rigid handle-bars, a pendent leg-frame, longitudinal side bars or beams connected at their front ends to the side sills, and at their rear ends to the leg-frame, an axle mounted in the lower ends of the side sills and carrying a single central wheel, an axle mounted in the side bars or beams and provided with a wheel mounted near the center of the barrow-body and of a diameter substantially the same as the diameter of the front wheel, and a self-folding spring-impelled foot-piece connected with the lower end of the leg-frame and automatically folded upwardly by the spring action when the barrow is moved forward, substantially as described.

3. A wheelbarrow, consisting of a body, a leg-frame, a frame supporting the body, a front wheel and a rear wheel journaled on the supporting-frame approximately at the longitudinal center thereof, a foldable foot-piece, and spring-hinges connecting the foldable foot-piece with the lower end of the leg-frame, said spring-hinges serving to automatically fold the foot-piece upwardly whenever the barrow is moved forward, substantially as described.

In testimony whereof I have hereunto set my hand in presence of two subscribing witnesses.

WILLIAM PAUL CARMICHAEL.

Witnesses:
J. J. DALE,
O. S. KULMAN.